US008231777B2

(12) United States Patent
Silva et al.

(10) Patent No.: US 8,231,777 B2
(45) Date of Patent: Jul. 31, 2012

(54) CATALYTIC CRACKING PROCESS FOR PRODUCTION OF DIESEL FROM SEEDS OF OLEAGINOUS PLANTS

(75) Inventors: Mauro Silva, Rio de Janeiro (BR); Andrea de Rezende Pinho, Rio de Janeiro (BR); Wilson Kenzo Huziwara, Rio de Janeiro (BR); Amilcar Pereira da Silva Neto, Rio de Janeiro (BR); Carlos Nagib Khalil, Rio de Janeiro (BR); Julio Amilcar Ramos Cabral, Rio de Janeiro (BR); Lúcia Cristina Ferreira Leite, Niteoi (BR); Luiz Carlos Casavechia, São Mateus do Sul (BR); Raul de Carvalho Silva, São Mateus do Sul (BR)

(73) Assignee: Petroleo Brasileiro S.A.—Petrobras, Rio de Janeiro (BR)

( * ) Notice: Subject to any disclaimer, the term of this patent is extended or adjusted under 35 U.S.C. 154(b) by 699 days.

(21) Appl. No.: 12/213,296

(22) Filed: Jun. 17, 2008

(65) Prior Publication Data

US 2008/0313955 A1 Dec. 25, 2008

(30) Foreign Application Priority Data

Jun. 21, 2007 (BR) ..................................... 0702541

(51) Int. Cl.
*C10G 47/02* (2006.01)
*C10L 1/08* (2006.01)

(52) U.S. Cl. ............ 208/108; 208/78; 208/113; 44/307; 44/605; 585/14; 585/240

(58) Field of Classification Search .................... 44/307, 44/605; 208/78, 108, 113
See application file for complete search history.

(56) References Cited

U.S. PATENT DOCUMENTS 7,112,229 B2 9/2006 Khalil et al.
2006/0186020 A1* 8/2006 Gomes ............................ 208/46
2007/0007176 A1* 1/2007 Pinho et al. ................... 208/108

FOREIGN PATENT DOCUMENTS

BR 8304794 9/1983
WO WO 2007090884 A2 * 8/2007

* cited by examiner

*Primary Examiner* — Ellen McAvoy
*Assistant Examiner* — Ming Cheung Po
(74) *Attorney, Agent, or Firm* — Nixon & Vanderhye P.C.

(57) ABSTRACT

The present invention comprises a thermocatalytic cracking process for the production of diesel oil from a charge of vegetable origin made from seeds of oleaginous plants in refineries possessing at least two FCC reactors. At least one of such reactors processes heavy gas oil or residue under conventional conditions while at least one of such reactors processes the charge of vegetable origin made from seeds of oleaginous plants under conditions suitable, for production of diesel oil. Said process employs the same catalyst utilized in the fluid catalytic cracking process which, simultaneously, processes a conventional charge.
The diesel, or biodiesel, oil produced by means of said process is of superior quality having a cetane number exceeding 40 given that the cracking reactions occur at low temperatures and the products obtained are less oxidized and consequently purer than products obtained by means of existing technology.

9 Claims, 1 Drawing Sheet

A
1
3
7
5
2
4
6
B

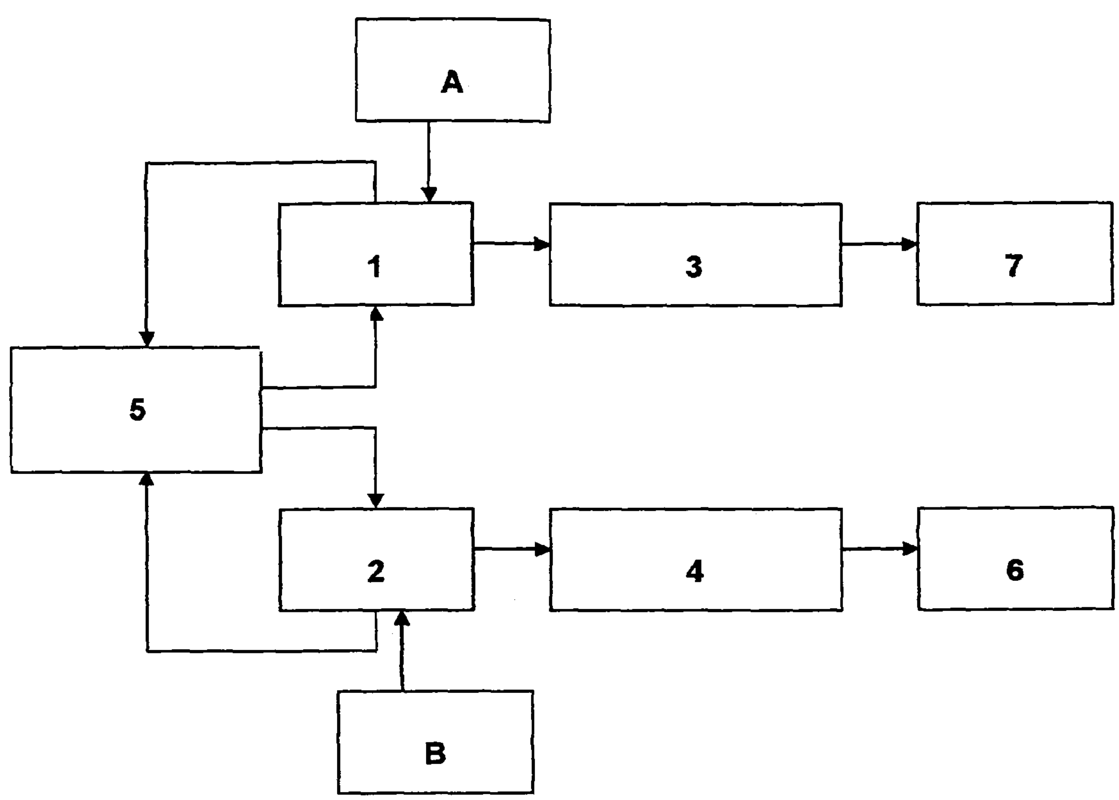
A
1
3
7
5
2
4
6
B

CATALYTIC CRACKING PROCESS FOR PRODUCTION OF DIESEL FROM SEEDS OF OLEAGINOUS PLANTS

This application claims priority to Brazil Application No. PI 0702541-6, filed Jun. 21, 2007, the entire contents of which is hereby incorporated by reference.

FIELD OF THE INVENTION

The present invention relates to a thermocatalytic process for the production of diesel oil employing a raw material of vegetable origin. More specifically the present invention relates to production of biodiesel oil utilising as such raw material of vegetable origin a charge of seeds of oleaginous plants, processed in a fluid catalytic cracking (FCC) reactor.

BACKGROUND OF THE INVENTION

Since the middle of the last century numerous investigations have sought alternative technologies for the production of fuels from renewable sources or industrial waste.

Transesterification or alcoholysis emerged as a significantly-advantageous procedure to make viable the obtainment of fuels from triglycerides, for example those present in vegetable oils.

Transesterification with methanol or ethanol however presents problems. The need to transport and handle large quantities of the said consumables requires excessively-high investment in construction and maintenance of safe plants, principally due to the high risks of poisoning and fire. In addition the burning of fuel produced through alcoholic transesterification of triglycerides generates considerable quantities of formaldehyde, acrolein and benzene which, in addition to being pollutants, cause damage to pistons and engines.

In FCC units the difficulty of producing diesel oil of good quality from vegetable oils mixed into the conventional charge arises from the very high reaction temperatures, never lower than 490° C. In addition the volume of vegetable oil available for the production of diesel oil is very small in relation to the volume of gas oil currently processed. In comparison with the transesterification process, the high investment cost makes the construction of an FCCU (FCC Unit) for exclusive vegetable-oil processing unviable. Nevertheless this alternative route for production of diesel based on the utilisation of seeds of oleaginous plants could be implemented in a refinery the FCCU whereof possesses at least two reactors already in existence.

RELATED ART

Studies published in the literature are to be found on processing vegetable oils in catalytic cracking units. In said studies such vegetable oil is always fed together with the conventional refinery-processed FCC charge, heavy gas oil or residue, that is to say the vegetable oil is cofed together with the conventional FCC charge (cofeeding). However conditions suitable for processing gas oil or residue are very different from those required for generation of diesel oil of good quality from vegetable oils. For processing heavy gas oil, reaction temperatures never lower than 490° C. are employed to prevent generating a large quantity of undesirable products, such as fuel oil. Low temperatures reduce the incidence of catalytic cracking reactions and achievement of total vaporisation of the charge in the initial portion of the aforementioned reactor. Should a charge not be vaporised in the initial part of a reactor of the ascending flow (riser) type, a large proportion of the reactions will occur wherein the surface of the catalyst is substantially blocked by still-liquid charge, prejudicing selectivity of the reactions.

Although vegetable oil processed at temperatures exceeding 490° C. does not produce diesel oil of suitable quality, nevertheless under such conditions the petrol generated is of very high quality because it is sulphur-free and is highly aromatic. On the other hand the products generated in the diesel band are equally aromatic, consequently having a low cetane number and unsuitable for use as diesel, because the excessive catalytic cracking caused by the very severe operational conditions favours a large number of hydrogen-transfer reactions, generating aromatic products. Consequently a large quantity of aromatic products is generated, even in the case of the charge of raw material of vegetable origin being free of such compounds.

That is to say, if on the one hand processing at temperatures exceeding 490° C. decreases the formation of fuel oil, a product of low value added, on the other hand it favours a large number of hydrogen-transfer reactions resulting in a significant quantity of aromatic compounds, even though the vegetable oil employed as feedstock is free of such compounds. Nevertheless diesel oil produced at high reaction temperatures is not of good quality, it having a very low cetane number. Low temperatures do not fully vaporise the charge in FCC reactors. When the charge is not fully vaporised immediately after the feed inlet to the reactor, catalytic selectivity diminishes, the pores of the catalyst becoming substantially blocked. As a consequence a large proportion of the reactions take place on the surface of the particles of the catalyst because the charge in the liquid phase does not manage to diffuse through the micropores of said catalyst and reach the active sites.

Patent PI 8304794-8, granted to Petróleo Brasileiro S/A PETROBRAS, teaches how to produce high-octane petrol in FCCs, however it does not mention how to produce products of appropriate quality in the diesel band. In said patent, cofeeding vegetable oil together with the conventional charge prevents the vegetable oil from being processed at appropriate reaction temperatures of lower than 490° C. Should such temperatures be employed significant fractions of the conventional charge, heavy gas oil or residue, would not be converted, producing a significant quantity of fuel oil, an undesirable product having low value added.

Patent application "Catalytic Cracking Process for production of diesel from vegetable oils" (PI 0502577-0) by Petrobras describes the invention of an FCC possessing at least two reactors, of the ascending flow (riser) type or of the descending flow (downflow) type, wherein at least one of such reactors operates under conventional conditions appropriate for processing heavy gas oil or residue whilst at least one of such remaining reactors operates processing vegetable oils at low reaction temperatures, appropriate for production of diesel from vegetable oils.

However production of diesel from vegetable oils in a separate FCC reactor unit, although involving lower investment in comparison with transesterification units given that it consists solely of the addition of an additional riser or downflow reactor, presents the disadvantage of higher operational cost arising from the high raw-material cost in the case of vegetable oils, in comparison with the low costs flowing from utilisation of a vegetable charge made from seeds of oleaginous plants.

Patent application by Petrobras "Process for Production of Biodiesel" (PI 0105888-6) describes the invention of an integrated process for producing biodiesel from seeds of oleaginous plants, preferably castor beans, such process promoting a transesterification reaction wherein the seeds themselves react with anhydrous ethanol in the presence of an alkaline catalyst to generate ethyl esters.

Although production of biodiesel by the transesterification process involves the construction of a complete unit, having the stages of seed drying, seed crushing, reaction of the oil contained within such seeds with the alcohol in the presence of a catalyst, separation of the liquor from the cake, recovery of the residual alcohol, separation of glycerine formed in the reaction and improvement of the biodiesel, involving large investments and high operational costs.

In this manner the present invention by utilising as raw material seeds of oleaginous plants in a separate riser or downflow reactor in existing FCC units favours the production of diesel from raw material of vegetable origin, consequently from a renewable source, having lower operating costs in comparison with vegetable oil raw material, and lower investment in comparison with units for the production of biodiesel by the transesterification route.

The present invention consequently combines the best of the technologies of the aforementioned applications (PI 0502577-0 and PI 0105888-6).

SUMMARY OF THE INVENTION

The present invention relates to a process for fluid catalytic cracking (FCC) having at least two reactors (riser or downflow), wherein at least one of said reactors operates under conventional conditions appropriate for processing heavy gas oil or residue at temperatures exceeding 490° C., while at least one of the remaining reactors operates at reaction temperatures in the band from 250° C. to 490° C., preferably between 350° C. and 400° C., appropriate for the production of diesel from seeds of oleaginous plants.

Said FCC riser reactors may operate at different reaction temperatures in an independent manner. Consequently the severity of reaction applied to each riser may be completely different, being adjusted to the intended operational objective and making possible the production of diesel from processing a charge of vegetable origin, such as the case of seeds of oleaginous plants, subject of the present invention.

For this purpose in the present invention such seeds of oleaginous plants are fed together with a liquid fluid, preferably water, to a crusher, the mixture of seeds and water then being pumped to the FCC riser or downflow.

In respect of the conventional process for production of biodiesel by transesterification, the present invention offers the additional advantage of not requiring alcohol for generating products in the diesel band and not generating byproducts such as glycerine. In this manner logistical difficulties of alcohol transport to small transesterification units, together with transport of the glycerine and of the biodiesel itself produced from such units to distribution bases, are overcome.

BRIEF DESCRIPTION OF THE DRAWING

FIG. 1 illustrates a flow diagram of an FCC unit having two FCC reactors (1, 2) operating with the same catalyst. Charges (A, B) feeding such reactors may be identical or different. Reactors 1 and 2 may be of the ascending flow, riser, type or of the descending flow, downflow, type.

DETAILED DESCRIPTION OF THE INVENTION

The principal objective of the present invention is the production of biodiesel utilising a vegetable charge made from seeds of oleaginous plants which is submitted to a process of fluid catalytic cracking, or FCC, for the production of the said biodiesel.

The present invention represents a fluid cracking process for production of diesel from seeds of oleaginous plants, preferably castor beans, they being crushed with a liquid fluid, preferably water, then being pumped to the separate riser or downflow reactor.

The present invention defines the utilisation of one of such reactors for processing conventional FCC charges, generating desirable products such as petrol, propene and other light olefins which may be maximised in such reactor operating under conventional conditions at reaction temperatures exceeding 490° C., whilst seeds of oleaginous plants, preferably castor beans, crushed with a liquid fluid, preferably water, may be processed in a second parallel reactor at temperatures lower than 490° C., generating products having characteristics of diesel oil of low aromaticity suitable for use in diesel engines.

Processing of vegetable oils in a second riser is economically much more attractive, solely requiring the installation of a second riser and separate fractionating in an FCC already in existence.

Operationally, reaction temperatures simply lower than 490° C. are suitable for production of diesel oil from vegetable oils.

The cost of construction of an FCC unit having a single riser for operation at temperatures lower than 490° C. is very high in comparison with the conventional process of production of diesel from vegetable oils, that is to say transesterification. It is clear that the small volumes of vegetable oils processed for the production of diesel, in comparison with the volumes normally processed in refineries, lead to the economic attractiveness of construction of a totally-new FCC unit being very small.

The present invention represents a process for the production of diesel having a high cetane number (exceeding 40) in fluid catalytic cracking units wherein a preheated working charge is placed in contact with a catalyst for the purpose of initiating catalytic cracking reactions in a riser or downflow reactor, the products from cracking being separated, the catalyst being regenerated to eliminate coke and transported back to the commencement of the reactor to reinitiate cracking.

In comparative terms, diesel oil obtained from processing a charge of vegetable origin made from seeds of oleaginous plants under mild FCC operational conditions (CN=40.7) is of greatly superior quality to diesel oil obtained from processing gas oil under conventional FCC operating conditions (CN<19), and it may be utilised in mixtures to maximise the value of the product.

PREFERRED METHOD OF EMBODIMENT

For the purpose of facilitating comprehension of the present invention it will be described with reference to FIG. 1 accompanying this specification and forming an integral part thereof.

The present invention comprises a thermocatalytic cracking process for production of diesel oil from vegetable oils in refineries possessing at least two FCC reactors, represented in a merely illustrative manner in the present invention by (1, 2).

FIG. 1 shows an operational flow diagram of an FCC unit processing, respectively, a charge of gas oil (A) and a charge of vegetable origin (B) made from seeds of oleaginous plants, in two distinct FCC reactors (1, 2) fed simultaneously with the same catalyst.

During processing, whilst said catalyst continues to the regenerator (5), the products obtained in (1, 2) are respectively fractionated in fractionators (3, 4), generating respective products (6, 7) which may then be mixed to maximise the value of a fraction.

At least one of said reactors (1) processes a charge of heavy gas oil or of residue (A) under conventional conditions, that is to say high reaction temperatures of between 490° C. and 650° C., having a contact time between charge and catalyst of 2 to 8 seconds, and a catalyst/gas oil ratio of 4 to 10.

At least one of said reactors (2) processes a charge of vegetable origin (B) made from seeds of oleaginous plants under conditions appropriate for the production of diesel oil, that is to say at low reaction temperatures between 250° C. and 490° C., preferably between 350° C. and 400° C., having a contact time between charge and catalyst of 0.5 to 2 seconds, and a ratio of catalyst/charge of seeds from oleaginous plants from 1 to 4.

The process of the present invention utilises a typical FCC reactor which may either be of the descending-flow downflow type or a reactor of the ascending-flow riser type. The contact time between the charge and the catalyst within such reactor should lie between 0.5 and 2 seconds, preferably between 1 and 1.5 seconds.

Said process converts raw material of vegetable origin made from seeds of oleaginous plants into combustible hydrocarbons and offers excellent efficiency in the obtainment of products of high purity.

The charge of gas oil (A) is processed in reactor (1) and sent to a first fractionator (3) and from the top of said first fractionator (3) the liquid products (7), petrol, diesel, LCO and decanted oil, are removed, being sent for the respective processes (not shown).

The charge of vegetable origin (B) made from seeds of oleaginous plants is mixed with water in a crusher (not shown), then being pumped to the riser of the FCC reactor (2) and from there to a second fractionator (4).

From the top of such second fractionator (4) light products (6) are removed, being sent to the section of recovery of gases in existence in the unit (not shown) for gas and LPG recovery.

More specifically seeds of oleaginous plants selected from a group comprising castor beans, soya, cotton, peanut, rape, cotton, jatropha, sunflower or any other seeds from oleaginous plants, pure or admixed with different seeds in any relative proportion, are converted into hydrocarbons in the diesel oil band by the same process, the formation of glycerine, a byproduct of the transesterification process, not occurring.

In general a fluid catalytic cracking unit (FCCU) in a refinery has solely a single reactor for fluid catalytic cracking of gas oil or residue. However there are refineries wherein such FCCUs possess two reactors working in simultaneous operation. In such units the streams of spent catalyst from said two reactors are mixed in the same rectification section wherein a single regenerator is utilised to burn off coke deposited on the catalyst. In addition such reactors may function in an independent manner with respectively different types of charge and differing reaction temperatures. The reaction severity applied to each reactor may be totally different making it possible to adjust them to preestablished operational objectives. In this manner it is possible to carry out the processing of seeds of oleaginous plants under milder conditions, at temperatures between 250° C. and 490° C., for the production of diesel oil having a cetane number exceeding 40, while simultaneously carrying out the processing of conventional heavy gas oils or residues under more severe conditions, employing a single catalyst flow for both processes.

The catalytic cracking process is achieved through contacting hydrocarbons with finely-divided catalyst. At the beginning of the reactor hot catalyst from which coke has been removed, or regenerated catalyst, comes into contact with the charge of hydrocarbons in a tubular reactor wherein the catalytic cracking reactions are carried out. Whilst the catalytic cracking reaction occurs along the reactor a substantial portion of coke, one of the reaction products of catalytic cracking, is deposited on the catalyst, deactivating it.

Said catalyst is separated from the reaction products and sent to a rectification/regeneration section in regenerator (5). Following rectification coke on the catalyst is burnt off at high temperature in a regeneration zone with oxygen-containing gas and the catalyst is regenerated in regenerator (5), it once again becoming suitable for return to said catalytic cracking reactor. Catalyst having a high coke content (or spent catalyst) is continually removed from the reaction zone and replaced by catalyst essentially free of coke coming from such regeneration zone. Fluidisation of the catalyst by diverse gaseous currents permits transport of the catalyst between the reaction zone and the regeneration zone.

A typical catalyst comprises 10%-60% w/w of a solid acid, 0%-50% w/w of alumina, 0%-40% w/w of silica, the remainder being kaolin. The solid acid may be a zeolite of the ZSM type, a zeolite of the faujasite type, a zeolite of the mordenite type, silico-aluminium phosphate (SAPO) or aluminium phosphate (ALPO). The same catalyst, fresh or equilibrium, is employed simultaneously in said two FCC reactors.

Tests in pilot units indicate that in general approximately 70% by weight of the oil contained in seed of oleaginous plants may be converted into biodiesel.

In this manner, by means of the process of the present invention, a biodiesel of superior quality is produced being free of sulphur and having a cetane number exceeding 40, given that the cracking reactions occur at low temperatures favouring the formation of aromatics. In addition thereto the products obtained are less oxidised and consequently purer than products obtained by means of the existing technology.

Although the present invention has been presented according to the preferred methods of embodiment thereof, those normally versed in the art will perceive appropriate variations and modifications which may be made to the present invention without, however, deviating from the spirit and scope of the invention and of the equivalents thereto, as stated in the claims presented below.

The invention claimed is:

1. A method of catalytic cracking for the production of diesel in a fluid catalytic cracking (FCC) unit having at least two FCC reactors, wherein at least one of such FCC reactors operates under conventional conditions for processing a heavy gas or oil residue feed (A) and another operates at mild conditions for processing a vegetable origin feed (B), with the same catalyst employed simultaneously in said at least two reactors, the process comprising feeding the vegetable origin feed (B) made of seeds of oleaginous plants crushed with water to obtain a suspension that is directly introduced into one reactor to produce combustible hydrocarbons that are mixed with hydrocarbons obtained from heavy gas oil or residue feed (A) to maximize diesel product of higher quality than diesel produced by feed (A) alone.

2. The method according to claim 1, the method comprising the steps of:

a) preheating the heavy gas or oil residue feed (A) and the vegetable origin feed (B);

b) introducing the feed (A) into a first FCC reactor operating under normal reaction conditions and at temperatures exceeding 490° C.; and c) introducing the feed (B) into a second FCC reactor operating under a temperatures between 250° C. and 490° C.;

d) obtaining a diesel fuel having improved quality when compared to diesel obtained from feed (A) alone, by combining diesel products obtained from the at least two reactors with the same catalyst employed simultaneously.

3. The method according to claim 1, wherein the seeds of oleaginous plants are selected from the group consisting of castor beans, soya, cotton, peanut, rape, jatropha, sunflower or any other seed of a suitable oleaginous plant, and admixtures in any proportion thereof.

4. The method according to claim 1 characterised by favouring the production of diesel oil having a high cetane number in fluid catalytic cracking units.

5. The method according to claim 4 characterised by the cetane number of said diesel oil exceeding 40.

6. The method according to claim 1 characterised by said catalyst containing 10%-60 weight % of solid acid, 0%-50 weight % of alumina, 0%-40 weight % of silica, the remainder being kaolin.

7. The method according to claim 6 characterised by said solid acid being a zeolite of the ZSM type, a zeolite of the faujasite type, mike silico-aluminium phosphate (SAPO), aluminium phosphate (ALPO), and any such combinations.

8. The method according to claim 1 characterised by said diesel oil produced being biodiesel oil having a cetane number exceeding 40.

9. The method according to claim 1, wherein approximately 70% wt of the oleaginous plants are converted into diesel hydrocarbon combustible.

* * * * *